United States Patent
Betzen et al.

(10) Patent No.: US 9,682,619 B2
(45) Date of Patent: Jun. 20, 2017

(54) FLAP ARRANGEMENT FOR A MOTOR VEHICLE

(71) Applicant: GM GLOBAL TECHNOLOGY OPERATIONS LLC, Detroit, MI (US)

(72) Inventors: Heiko Betzen, Bausendorf (DE); Markus Frommann, Bingen am Rhein (DE); Klaus Gerst, Nauheim (DE); Marco Haupt, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/665,576

(22) Filed: Mar. 23, 2015

(65) Prior Publication Data

US 2015/0291024 A1     Oct. 15, 2015

(30) Foreign Application Priority Data

Mar. 22, 2014   (DE) .................... 20 2014 002 556 U

(51) Int. Cl.
*B60K 15/05*       (2006.01)

(52) U.S. Cl.
CPC ........ *B60K 15/05* (2013.01); *B60K 2015/053* (2013.01)

(58) Field of Classification Search
CPC .......................... B60K 15/05; B60K 2015/053
See application file for complete search history.

(56) References Cited

U.S. PATENT DOCUMENTS

| | | |
|---|---|---|
| 8,585,119 B2 | 11/2013 | Beck |
| 2012/0222356 A1 | 9/2012 | Beck |
| 2014/0183896 A1 | 7/2014 | Cho et al. |

FOREIGN PATENT DOCUMENTS

| | | | |
|---|---|---|---|
| DE | 20005552 U1 | 6/2000 | |
| DE | 102006011198 A1 | 9/2007 | |
| DE | 102012104986 A1 | 12/2012 | |
| FR | 2731391 A1 | 9/1996 | |
| GB | 681764 A | 10/1952 | |
| JP | WO 0226515 A1 * | 4/2002 | ............ B60K 15/04 |

OTHER PUBLICATIONS

Great Britain Patent Office, Great Britain Search Report for Great Britain Application No. 1504655.0, dated Sep. 17, 2015.
German Patent Office, German Search Report for German Application No. 202014002556.8, dated Dec. 10, 2014.

* cited by examiner

*Primary Examiner* — Glenn Dayoan
*Assistant Examiner* — Melissa A Black
(74) *Attorney, Agent, or Firm* — Lorenz & Kopf LLP

(57) ABSTRACT

A flap arrangement for a motor vehicle is disclosed which includes a flap, and more specifically a tank flap, a plunger on which the flap is rotatably mounted, and a base, and more particularly a tank trough on which the plunger is shiftably mounted in a projection direction (A).

15 Claims, 9 Drawing Sheets

FLAP ARRANGEMENT FOR A MOTOR VEHICLE

CROSS-REFERENCE TO RELATED APPLICATION

This application claims priority to German Patent Application No. 202014002556.8, filed Mar. 22, 2014, which is incorporated herein by reference in its entirety.

TECHNICAL FIELD

The present disclosure relates to a flap arrangement, in particular a tank flap arrangement, for a motor vehicle and to a motor vehicle, in particular a passenger car, with such a flap arrangement.

BACKGROUND

In particular tank flaps of motor vehicles are generally articulated on the body via a rotatable hinge arm, which at the same time spaces the tank flap from the body when during pivoting open. This hinge arm requires corresponding stowage space.
From DE 10 2006 011 198 A1 a locking device for a tank flap of a vehicle with a so-called push-push kinematic is known, which can be alternately locked and unlocked by consecutive pushing-in and releasing again.

SUMMARY

According to an aspect of the present invention, a flap arrangement for a motor vehicle comprises a flap, a plunger and a base, according to a further aspect of the present invention, a motor vehicle, in particular a passenger car, comprises such a flap arrangement and a flap border surrounding the same.

In an embodiment, the flap is a tank flap for covering a tank aperture, in particular of a filler opening for fuel and/or an electrical interface for electrically charging an energy storage unit of the motor vehicle. In an embodiment, the closed flap does not project at least substantially towards the outside over a flap border of a body of the motor vehicle, to the outside, in a further development, the closed flap closes off at least substantially with the flap border.

In an embodiment, the base is releasably or permanently connected to the body of the motor vehicle, in particular integrally formed with the same. In an embodiment, the base at least partially forms a tank trough with a tank aperture.

According to an aspect of the present invention, the flap arrangement comprises a plunger on which the flap is rotatably mounted, and which in turn is reversibly movably mounted on the base in a projection direction.

Because of this, the plunger, for pivoting open the flap in an embodiment can be moved in projection direction from a retracted or closing position into a pivot position in which it projects relative to the flap border, in which an embodiment a region of the flap, which projects over an axis of rotation of the flap, can pivot or be pivoted without colliding with the flap border, wherein in an advantageous embodiment no overhanging hinge arm has to be stowed away.

The projection direction in an embodiment includes an angle with a perpendicular or normal on an outside of the closed flap and/or on an outside of the flap border of the body of the motor vehicle which is maximally 45°, in particular maximally 30°, preferentially maximally 15° and in particular maximally 5°. In particular, the projection direction can be at least substantially perpendicular to an outside of the closed flap or of a flap border of the motor vehicle. Because of this, the flap or its pivot bearing can be advantageous spaced from the body with little movement travel of the plunger, in and embodiment, in particular in order to create space for a region of the flap that projects over the axis of rotation of the flap.

In an embodiment, the flap is rotatably or pivotably mounted on the plunger about a single axis of rotation. Because of this, a simple and/or stable kinematic can be realized in embodiment. The axis of rotation in an embodiment is at least substantially perpendicular to the projection direction. In an embodiment, the in particular areal flap and the plunger are rotatably connected to one another directly or free of a hinge arm through a single or multiple-part hinge shaft. In particular, the axis of rotation projected in a plane that is parallel to the flap can lie within a contour of the flap projected in this plane, while an axis of rotation that is projected in a corresponding plane of a flap articulated by means of a hinge arm, is regularly located outside its contour.

The plunger can be manually moveable or adjustable in and/or against the projection direction manually and/or in particular hydraulically, pneumatically, electromagnetically and/or electromotorically.

In an embodiment, the flap arrangement comprises a push-push kinematic for the in particular alternating locking and unlocking of the plunger, in particular with the base, and/or a push-push kinematic for the in particular alternating locking and unlocking of the flap, in particular with the base or the plunger, through consecutively manual pushing-in and releasing of the plunger or of the flap pivotably connected to it against the projection direction. Because of this, the operability and/or the design can be improved in an embodiment. Through a push-push kinematic for the locking and unlocking of the flap with the base the plunger supporting or mounting the flap can be advantageously fixed on the base at the same time in an embodiment.

In an embodiment, the push-push kinematic comprises a link member with a link and an engagement member for the permanently or temporarily releasable positively joined engaging in this link, which by engaging against the projection direction in the link, in particular by moving over a switch, into an engagement position, in which it engages behind an undercut, which blocks extending the engagement member in projection direction in a positively joined manner and by renewed engaging against the projection direction in the link, in particular by moving over a further switch, can be adjustable into a release position in which it releases, in particular, bypasses or moves over the undercut. Link member and/or engagement member in an embodiment can be rotated or pivoted against the projection direction through an engagement movement. The push-push kinematic can for example be designed according to DE 10 2006 011 198 A1 mentioned at the outset, to which exemplarily and complementarily reference is made and the content of which is expressly included in the present disclosure.

In an embodiment, the engagement member is rigidly arranged on the flap and the link member moveably on the base in order to be able to get in and out of engagement with the engagement member. In another embodiment, the link member is rigidly arranged on the flap and the engagement moveably on the base in order to be able to get in and out of engagement with the link member. Because of this, the evasive movement for the bringing into and out of engagement in each case advantageously takes place in an embodiment on the base side so that a joint serving for this purpose need not be pivoted with the flap.

In another embodiment, the engagement member is rigidly arranged on the base and the link member moveably on the flap in order to be able to get in and out of engagement with the engagement member. In another embodiment, the link member is rigidly arranged on the base and the engagement member moveably on the flap in order to be able to get in and out of engagement with the link member. Because of this, the evasive movement in each case advantageously takes place on the flap side in an embodiment, so that a joint serving for this purpose is better accessible with the flap pivoted open.

In an embodiment, the engagement member is connected to the flap in an articulated manner and guided on the plunger in a positive manner, wherein in a further development the link member is then arranged on the base in projection direction in an axially fixed manner. In another embodiment, the link member conversely is connected to the flap in an articulated manner and guided on the plunger in a positively joined manner, wherein the engagement member in a further development is then arranged axially fixed on the base in projection direction. Because of this, an in particular design and/or kinematically advantageous in particular positive arrangement can be made available in an embodiment. A guide of the link member or engagement member on the plunger can in particular comprise a groove, which preferentially at least substantially extends in projection direction. Because of this, a short locking path can be realized in an embodiment.

In an embodiment, the flap arrangement comprises a transmission for the in particular positively joined compulsory pivoting-out of the flap as a consequence of a moving of the plunger in the projection direction. Because of this, extending the plunger in an embodiment can advantageously bring about automatic pivoting out or pivoting open of the flap from a closing position that is at least substantially parallel in particular to the flap border into an open position that is rotated about the axis of rotation, in which the flap in an embodiment includes an angle with a perpendicular or normal on the outside of the closed flap or flap border which amounts to maximally 60°, preferentially maximally 45°, in particular maximally 30°, preferentially maximally 15° and in particular maximally 5°, in particular, at least substantially, is oriented perpendicularly to the flap border.

In a further development, the transmission comprises an empty travel for moving the moving direction from a retracted or closing position into a pivot starting position which with respect to the flap border projects or is disengaged towards the outside without pivoting-open the flap, which in projection direction is located between the closing position lies between the closing position and a pivot end position, which in projection direction with respect to the flap border projects further or is disengaged towards the outside. Because of this, the plunger in an embodiment can initially advantageously extend in an projection direction without pivoting the flap before the flap which is then already spaced from the flap border subsequently pivots out in the projection direction as a consequence of a further moving of the plunger. Pivot starting and/or end position in an embodiment are each formed by a pivot position in terms of the present invention.

In another further embodiment, the transmission does not include any empty travel for moving the plunger in the projection direction from a retracted or closing position without simultaneous pivoting open of the flap but already commences pivoting the flap even when the plunger is moved in the projection direction from a retracted or closing position.

In an embodiment, the flap can be (further) pivoted open relative to the transmission or can be pivoted open even further in a pivot end position of the plunger, in particular manually. In another embodiment, the flap is coupled to the transmission on two sides or in such manner that each movement of the plunger in and/or against the projection direction in particular positively inevitably brings about pivoting out or pivoting in of the flap and vice versa any pivoting out and/or pivoting in of the flap in particular positively inevitably, brings about a movement of the plunger in or against the projection direction.

In an embodiment, the transmission can be a crank, coupling, cam, wheel, in particular tooth or friction wheel, pulling means and/or screw transmission.

In an embodiment, it comprises a transmission member with a link guide on the base, which is rotatably connected to the flap. Because of this, simple, compact and/or robust coupling can be advantageously realized in an embodiment.

Additionally or alternatively, the transmission comprises one or multiple gears. Because of this, a precise and/or robust coupling and/or step-up or step-down transmission between moving in the projection direction and pivoting open of the flap can be advantageously realized in an embodiment.

In an embodiment, the transmission comprises a rack which is moveably mounted in particular in the projection direction for pivoting out the flap, a (further) toothing and at least a rotatably mounted gear which meshes with the toothing and/or the rack. In an embodiment, the toothing can be coupled to the flap in particular in an articulated manner or comprise a stop for limiting a pivoting in and/or pivoting out of the flap. In a further development, the stop can project or overhang obliquely to a toothing of the rack.

In a further development the (further) toothing is fixed on the base and at least one gear rotatably mounted on the plunger so that in an embodiment when moving the plunger in the projection direction the gear that is rotatably mounted on the plunger rolls on the base-fixed (further) toothing, with which it meshes. The gear or a further gear coupled to the same meshes with the rack and thus moves the same in particular in the projection direction so that the rack, in particular via its coupling or the stop, pivots out the flap.

In a further development, the (further) toothing is conversely fixed to the plunger and at least one gear rotatably mounted on the base so that in an embodiment when moving the plunger in the projection direction the plunger-fixed (further) toothing rotates the gear that is rotatably mounted on the base, which meshes with it. The gear or a further gear coupled to the same meshes with the rack thus moving the same in particular in the projection direction so that the rack, in particular via its coupling or the stop, pivots out the flap.

In an embodiment, the flap arrangement comprises a stop for the in particular positive locking or elastic limiting of a pivoting in and/or pivoting out of the flap and/or a moving of the plunger against and/or in the projection direction. In an embodiment, the plunger can be advantageously moved against the projection direction through engaging the flap in particular by a stop for limiting pivoting-in of the flap towards the plunger or its closing position.

In an embodiment, the flap arrangement comprises an in particular mechanical, hydraulic, pneumatic or (electro) magnetic, preload means for preloading the plunger in the projection direction. Because of this, the plunger following unlocking in particular on the base and/or through a push-push kinematic, in an embodiment automatically opens out of the closing in the disengaged position. In a further development, the preload means is arranged in a guide of the plunger on the base, in particular in a guide sleeve of the base, on which a bore of the plunger is moveably guided. Because of this, a compact design can be realized in an embodiment.

In a further development, the preload means is arranged on the transmission for pivoting out the flap, in particular between the transmission and the plunger, in particular between the moveably mounted rack and the plunger. In particular, when in an embodiment the preload means spreads open the flap and the plunger in projection direction via the transmission it is conversely preloaded against the projection direction through a retraction of the plunger because of a transmission function which converts a moving of the plunger in projection direction into a pivoting open of the flap and accordingly seeks to drive the plunger out in projection direction. Further advantageous further developments of the present invention are obtained from the sub-claims and the following description of preferred embodiments.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
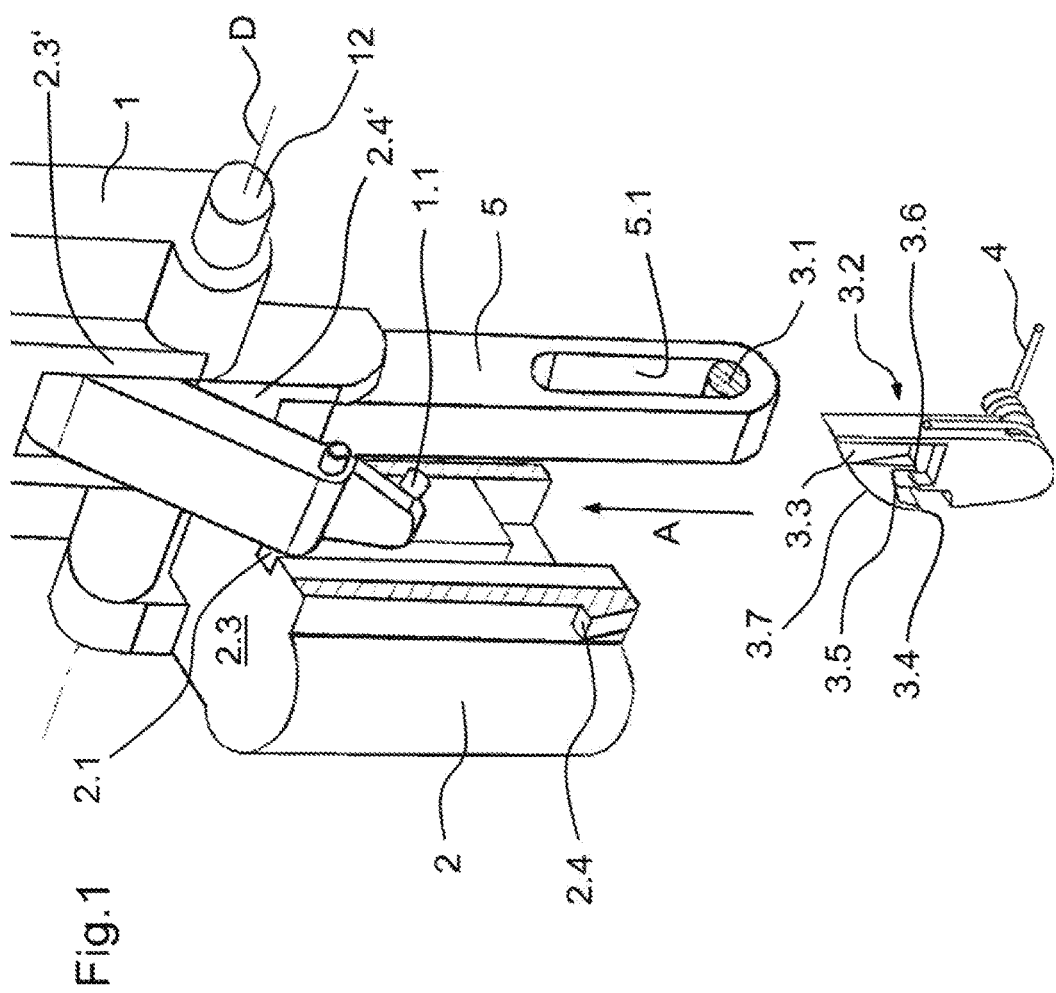
FIG. 1 shows a part of a flap arrangement of a motor vehicle according to an embodiment of the present invention in a perspective part section with a tank flap in an open position and a plunger in a pivot end position.
Figure 4:
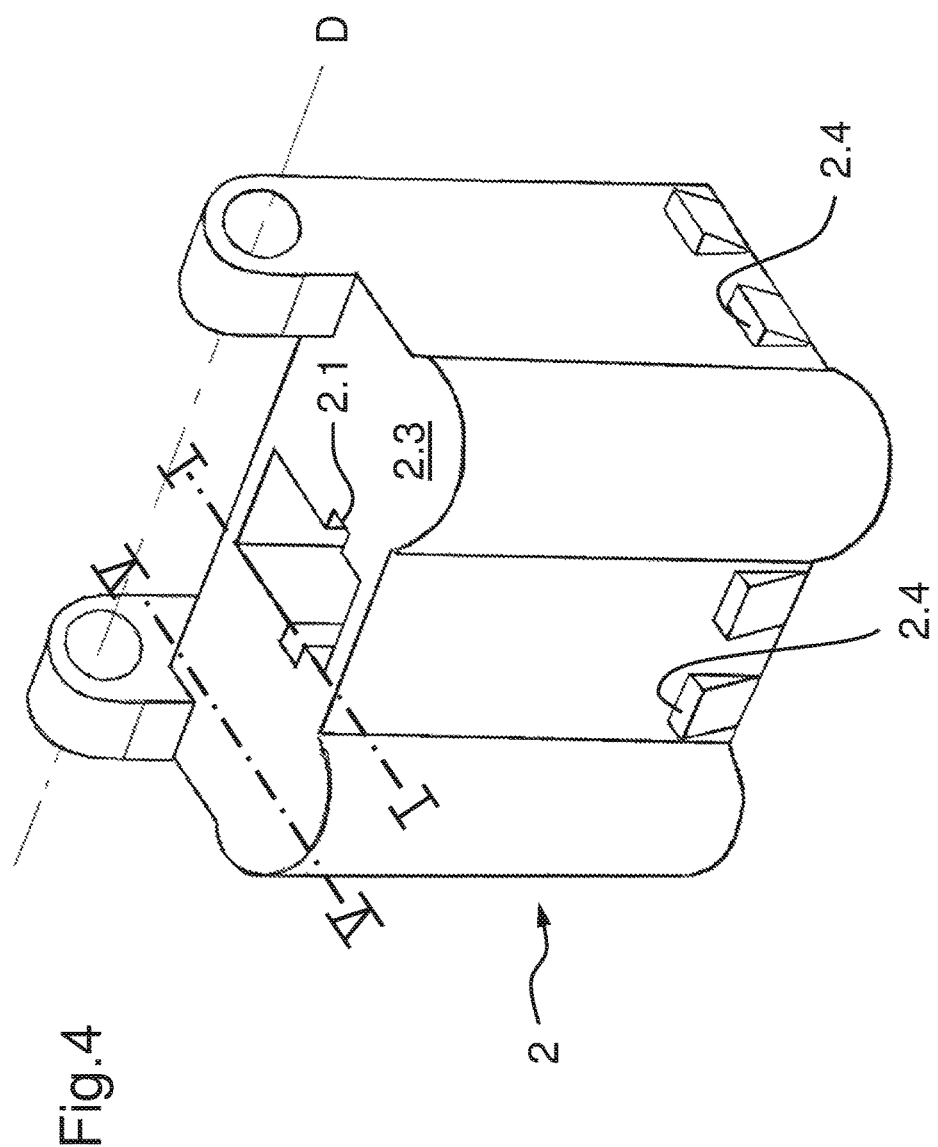
FIG. 4 shows the plunger of the flap arrangement of FIG. 1-3 in a perspective individual representation.

FIG. 1 shows a part of a flap arrangement of a motor vehicle according to an embodiment of the present invention in a perspective part section with a tank flap 1 in an open position and a plunger 2 in a pivot end position. Here, the plunger 2 is cut free along the line I-I in FIG. 4 in which it is shown in perspective individual representation in order to explain individual functions.

Except for the flap 1 and the plunger 2, the flap arrangement comprises a base from which a base-fixed pin 3.1 in FIG. 1 of a link guide that is explained in the following and a base-fixed link member 3.2 of a push-push kinematic explained in the following are shown.

Figure 2:
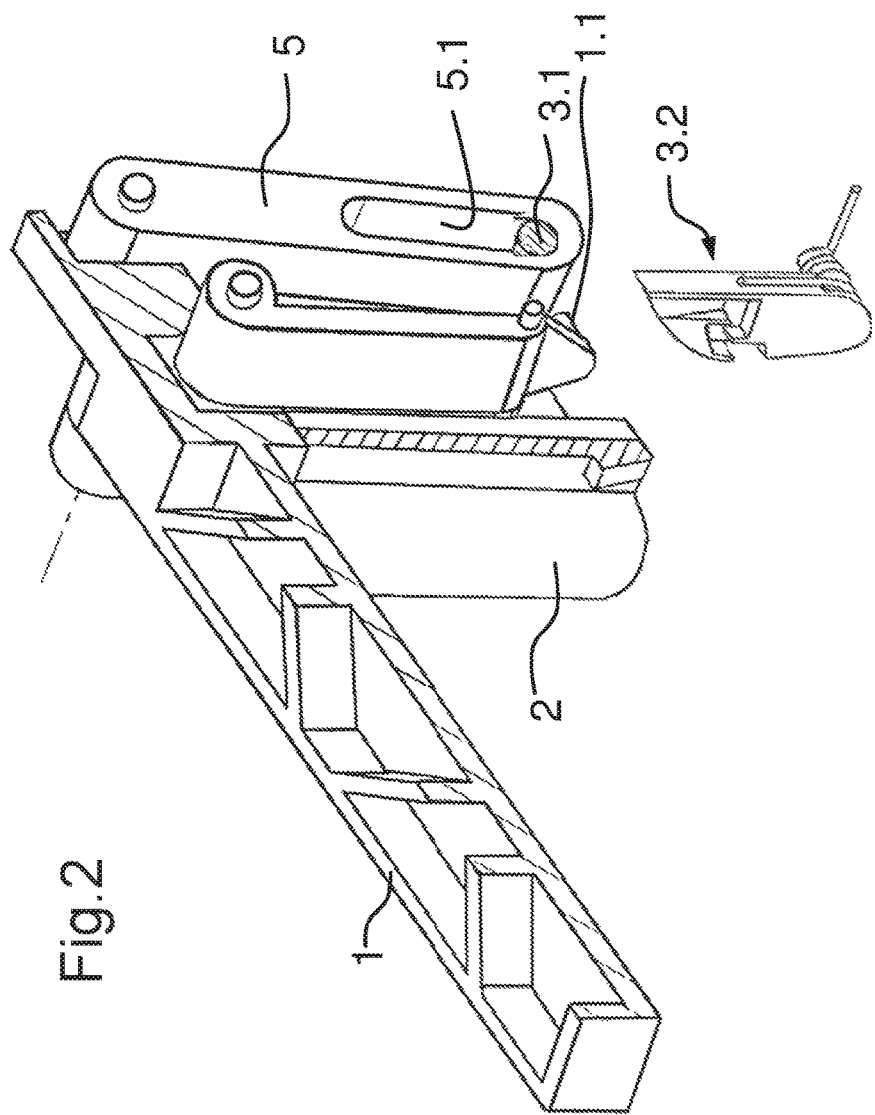
FIG. 2 shows the part of the flap arrangement of FIG. 1 with the tank flap in a closing position and the plunger in a pivot starting position.
Figure 3:
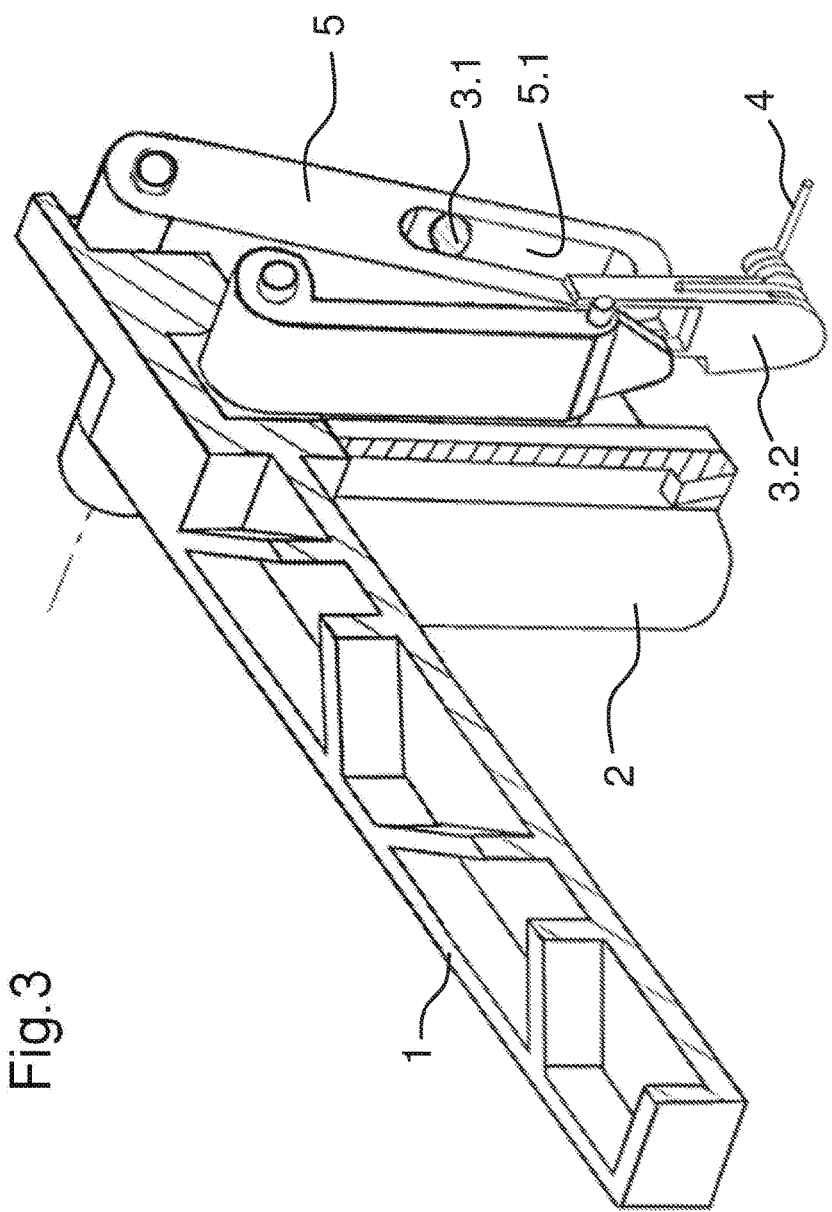
FIG. 3 shows the part of the flap arrangement of FIG. 2 with the tank flap in the closing position and the plunger in a closing position.

In the open position shown in FIG. 1, the flap 1 is oriented at least substantially perpendicularly to a flap border of a body of the motor vehicle (not shown), in a closing position shown in FIG. 2, 3 by contrast at least substantially parallel to the flap border, wherein the closed flap 1 shown in FIG. 3 closes off at least substantially flush with the flap border, i.e. does not protrude over the same.

The flap 1 is rotatably mounted on plunger 2 about a sole axis of rotation D by means of a hinge shaft 12, so that it can pivot between its open position (see FIG. 1) and its closing position (see FIG. 2, 3).

The plunger 2 in turn is movably mounted in a reversible manner on the base in a projection direction A (from the bottom up in FIG. 1), which is perpendicular to the axis of rotation D. To this end, the base comprises two guide sleeves (not shown), on each of which a bore 2.2 of the plunger 2 is movably guided, which is evident in the section of FIG. 5.

Because of this, the plunger 2 in projection direction A can be shifted in projection direction A from a retracted or closing position, which is shown in FIG. 3, into a pivot start position that relative to the flap border projects to the outside, which is shown in FIG. 2, and from the same in projection direction A further into a pivot end position which further projects relative to the flap border, which is shown in FIG. 1. In this pivot start or end position an in FIG. 1, 2 right region of the flap, which protrudes over its axis of rotation D, can pivot or be pivoted without colliding with the flap border without an overhanging hinge arm having to be stowed for this purpose. The plunger 2 which is movably mounted in a reversible manner can conversely be retracted against the projection direction A from the pivot (end or start) position into its closing position.

The areal flap 1 and the plunger 2 are rotatably connected to one another directly or hinge arm-free through the hinge shaft 12. It is evident in particular in FIG. 2, 3 that the plane which is parallel to the flap, i.e. axis of rotation D which is vertically projected in FIG. 2, 3, lies within a contour of the flap 1 likewise projected in this plane.

The flap arrangement has a push-push kinematic for the alternating locking and unlocking of the flap 1 with the base through consecutive manual engaging and releasing again of the plunger 2 or of the flap 1 that is hinged to the same against the projection direction A.

The push-push kinematic in addition to the base-fixed link member 3.2 comprises an engagement member 1.1, which by engaging against the projection direction A comes into engagement with a sliding slot 3.3 of the link member 3.2 and in the same is adjustable by moving over a switch 3.4 into an engagement position shown in FIG. 3, in which it engages behind an undercut 3.5, which blocks extending of the engagement member 1.1 in projection direction A in a positive manner and by renewed engaging against the projection direction A in the sliding slot 3.3 by moving over a further switch 3.6 into a release position, in which it releases the undercut 3.5 and can exit from the sliding slot 3.3 in order to move around the undercut 3.5 upon a movement in projection direction A. The link member 3.2 is pivotable through an engagement movement against the projection direction A against a spring 4. The sliding slot 3.3 comprises an insertion surface 3.7, on which the engagement member 1.1 with locking engagement movement runs up against the projection direction A and is guided to the in FIG. 1 left switch 3.4, wherein the spring 4 because of the running down of the engagement member 1.1 in the direction of the switch 3.4 is tensioned on the insertion surface 3.7 and resets on moving over the switch 3.4. The spring 4 to this end preloads the link member 3.2 in the direction of the switch 3.4 and during unlocking dips away through the ramp shape of the link channel 3.3 in the direction of the link member axis of rotation. The spring 4 is twisted once and compressed.

The engagement member 1.1 is hinged to the flap 1 and guided on the plunger 2 in a slot 2.1 on both sides in a positive manner, which extends at least substantially in projection direction A.

The flap arrangement comprises a transmission for the positively joined automatic pivoting-out of the flap 1 as a consequence of a shifting of the plunger 2 in the projection direction A with a transmission member 5, which is rotatably connected to the flap 1. The transmission member 5 comprises an elongated hole 5.1 in which the base-fixed pin 3.1 is guided in a positive manner. Pin 3.1 and elongated hole 5.1 form a link guide of the transmission member 5 on the base.

Because of this, the transmission has a dead travel for shifting the plunger 2 in the projection direction A out of the retracted closing position (see FIG. 3) into the pivot start position which projects towards the outside relative to the flap border (see FIG. 2) without pivoting-out the flap 1. Upon further shifting of the plunger 2 in the projection direction A into the pivot end position (see FIG. 1), the transmission or the transmission member 5 which is rotatably connected to the flap 1 pivots the flap 1 in a positive manner automatically from its closing into its open position as a consequence of the link guide 3.1-5.1, as is illustrated by the Figure sequence (FIG. 3→) FIG. 2→FIG. 1.

The plunger 2 of the flap arrangement comprises a stop 2.3 for the positively joined limiting of a pivoting-in of the flap 1 and a stop 2.4 for the positively joined limiting of a shifting of the plunger 2 in the projection direction A. The flap 1 of the flap arrangement comprises a stop 2.3' for actuation in closing position direction and a stop 2.4' for limiting a flap opening angle.

Figure 5:
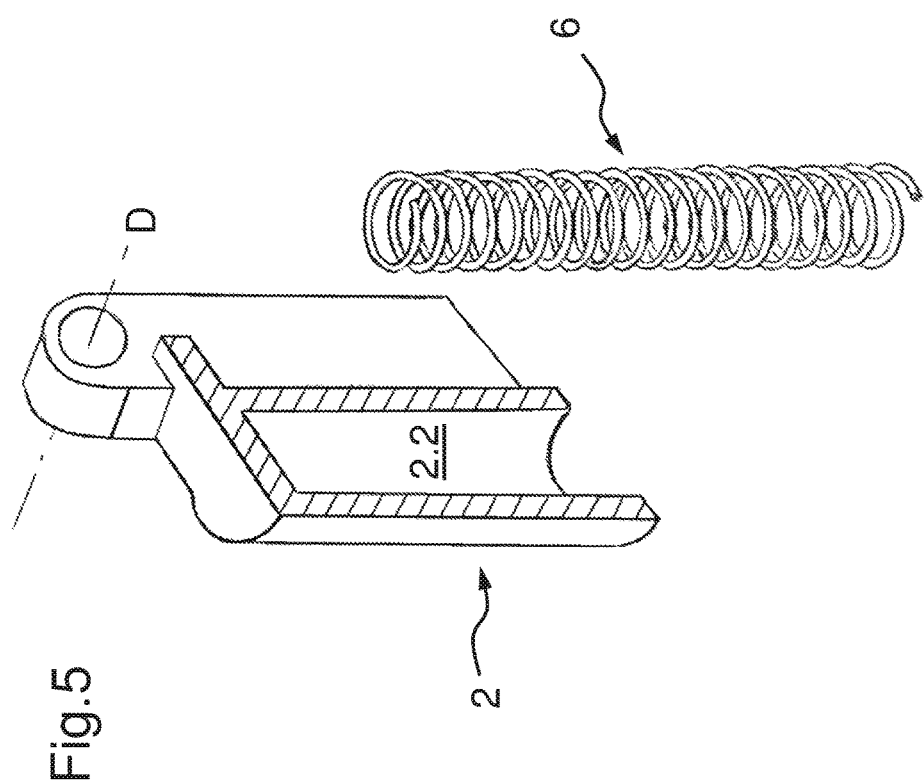
FIG. 5 is a section along the line V-V in FIG. 4.

The flap arrangement furthermore comprises a mechanical preload means in the form of compression springs 6 for preloading the plunger 2 in the projection direction A, which are arranged in the guide sleeves of the base, on which the bores 2.2 of the plunger 2 are movably guided. In the section of FIG. 5, the compression spring 6, which is arranged in the guide sleeve guiding the bore 2.2 is shown in exploded representation pulled out next to the bore 2.2.

In the following, a cyclical mode of operation of the flap arrangement is described with reference to the Figure sequence FIG. 3→FIG. 2→FIG. 1→FIG. 2→FIG. 3.

In the state shown in FIG. 3 the flap 1 is locked on the base in its closing position through the push-push kinematic 1.1-3.1, the engagement member 1.1 of which engages behind the undercut 3.5 of the base-fixed link member 3.2 thus blocking a movement in projection direction A. Because of this, shifting of the plunger 2 in projection direction A is also blocked. Here, the flap 1 lies flat on a trough edge and is preloaded in projection direction A (not shown) via an elastic seal, for example a rubber lip.

By manually engaging the flap 1 (downwards in FIG. 3) and with it the plunger 2 mounting it against the projection direction A, the engagement member 1.1 moves over the switch 3.6 of the sliding slot 3.3 of the link member 3.2, releases the undercut 3.5 so that the flap 1 is unlocked and because of the ramp shape moves out of engagement with the sliding slot 3.3. To this end, the spring 4 preloads the base-fixed pivotable link member 3.2 in FIG. 1 in anti-clockwise direction as described above with reference to FIG. 1, the elongated hole 5.1 has a corresponding distance reserve for this unlocking engaging (above the pin 3.1 in FIG. 1).

The plunger 2 is subsequently driven by the springs 6 in projection direction A and moves from its closing into its pivot start position (FIG. 3→FIG. 2). In the process, the engagement member 1.1 comes out of engagement with the sliding slot 3.3. The plunger 2 is further driven out by the springs 6 in projection direction A and moves over the pivot start position until it is positively held in its pivot end position by the stops 2.4 (FIG. 2→FIG. 1). In the process, the transmission member 5, in the elongated hole 5.1 of which the base-fixed pin 3.1 comes to a stop on the end side, pivots the flap 1 on which the transmission member 5 is rotatably articulated, from its closing position into its open position.

If a user again presses onto the flap 1 standing open from the outside (from the right in FIG. 1), the same initially pivots into its closing position (FIG. 1→FIG. 2), in which it rests on the stop 2.3 of the plunger 2. In the process, the slot 2.1 on both sides guides the engagement member 1.1 of the push-push kinematic. At the same time, the plunger 2 is moved a little against the projection direction A via the transmission member 5 and the base-fixed pin 3.1.

By pressing the flap 1 resting on the plunger 2 further down, the plunger 2 is engaged against the projection direction A. In the process, the engagement member 1.1 comes into engagement with the insertion surface 3.7 of the sliding slot 3.3 of the link member 3.2 of the push-push kinematic. Upon further engagement against the projection direction, the engagement member 1.1 runs down on the insertion surface 3.7 and pivots the link member 3.2 against the spring 4 before it runs over the switch 3.4. The spring 4 pivots the link member 3.2 back so that the engagement member 1.1 upon a subsequent manual releasing of the flap 1 engages behind the undercut 3.5 of the sliding slot 3.3, so that the push-push kinematic 1.1-3.2 locks the flap 1 on the base and thereby also blocks the plunger 2 in projection direction A against the preload of the springs 6.

Following this, the process described above can be carried out again.

The stop 2.3 limits pivoting-in of the flap 1 and then additionally serves as support in order to provide the flap with a defined actuation position in closing direction. Limiting pivoting-out of the flap 1 and shifting of the plunger 2 in the projection direction A is effected in particular via the elongated hole 5.1 in connection with the pin 3.1, which thus likewise constitute stops. The recess 3.5 and the bore 2.2 also act as stop for limiting shifting of the plunger 2 in or against the projection direction A.

FIG. 6-9 show a flap arrangement of a motor vehicle according to a further embodiment of the present invention in a perspective view. Features corresponding to one another are identified by identical reference characters so that reference is made to the above description and differences will be discussed in the following.

Figure 6:
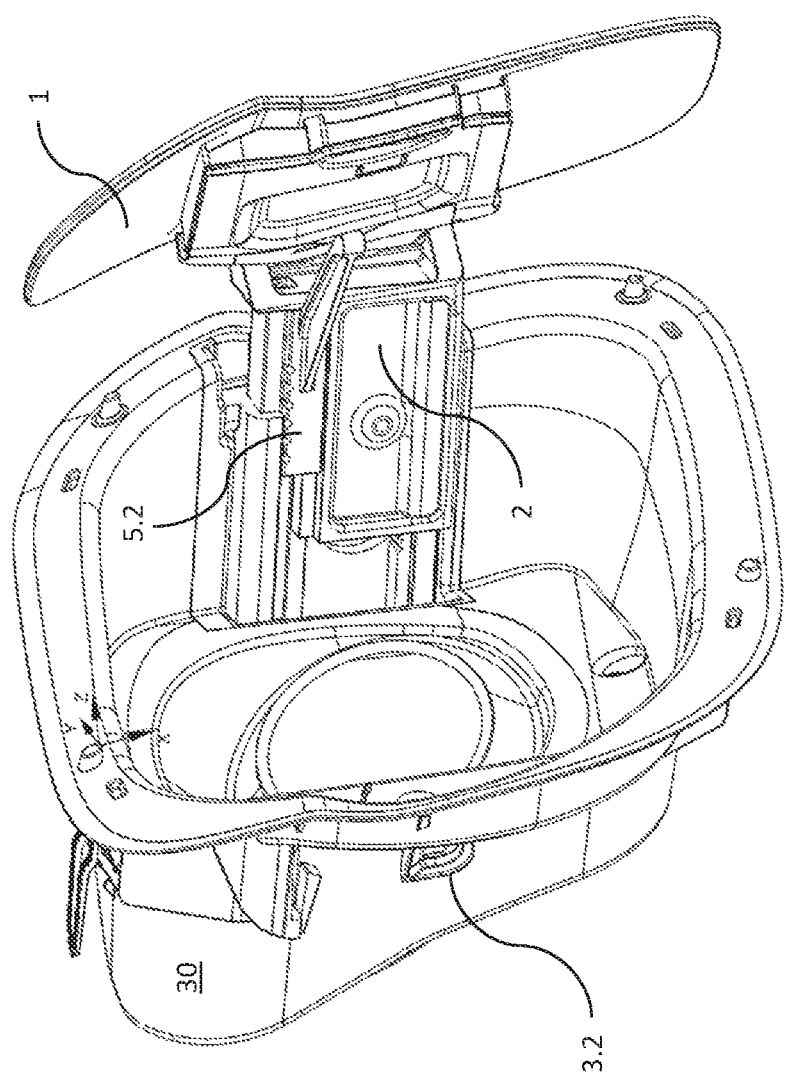
FIG. 6 shows a flap arrangement of a motor vehicle according to a further embodiment of the present invention in a perspective view with a tank flap in an open position and a plunger in a pivot end position.
Figure 7:
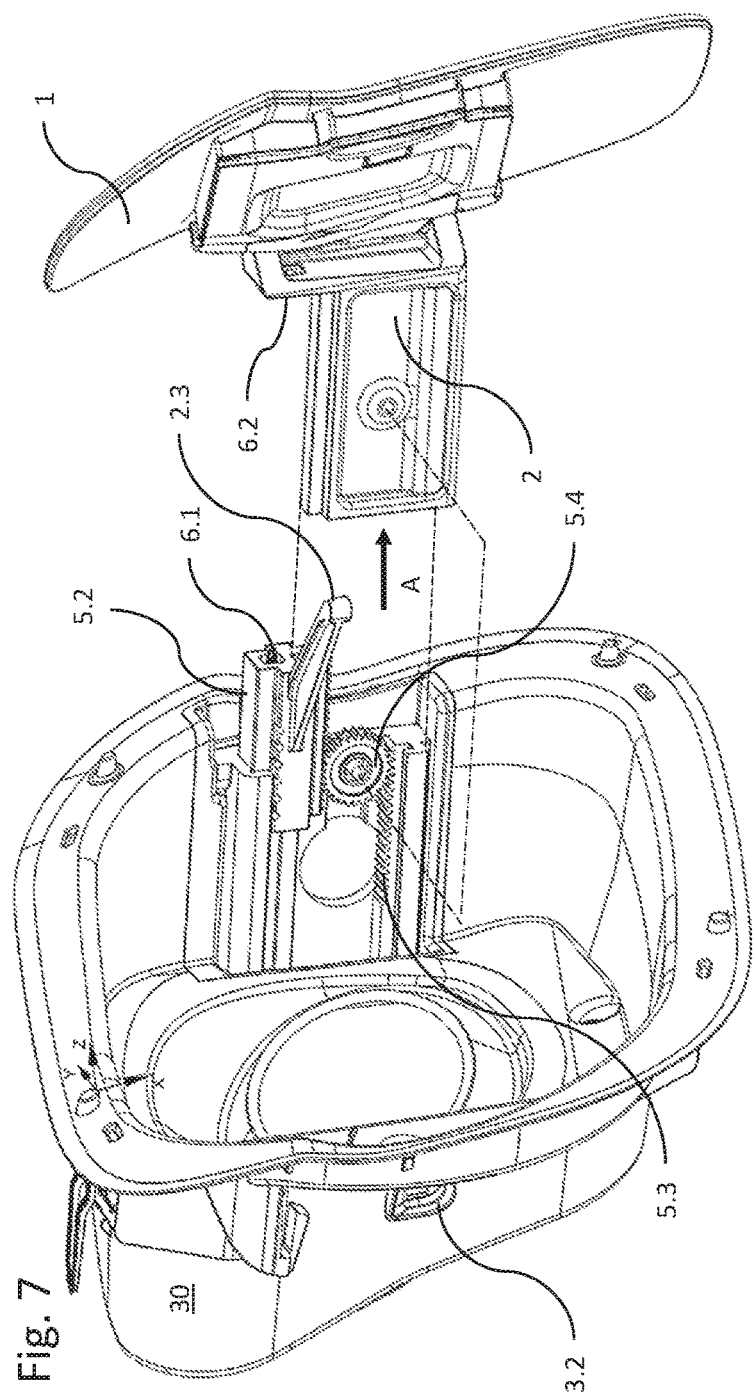
FIG. 7 shows the flap arrangement of FIG. 6 with plunger extracted in the manner of an exploded representation.
Figure 8:
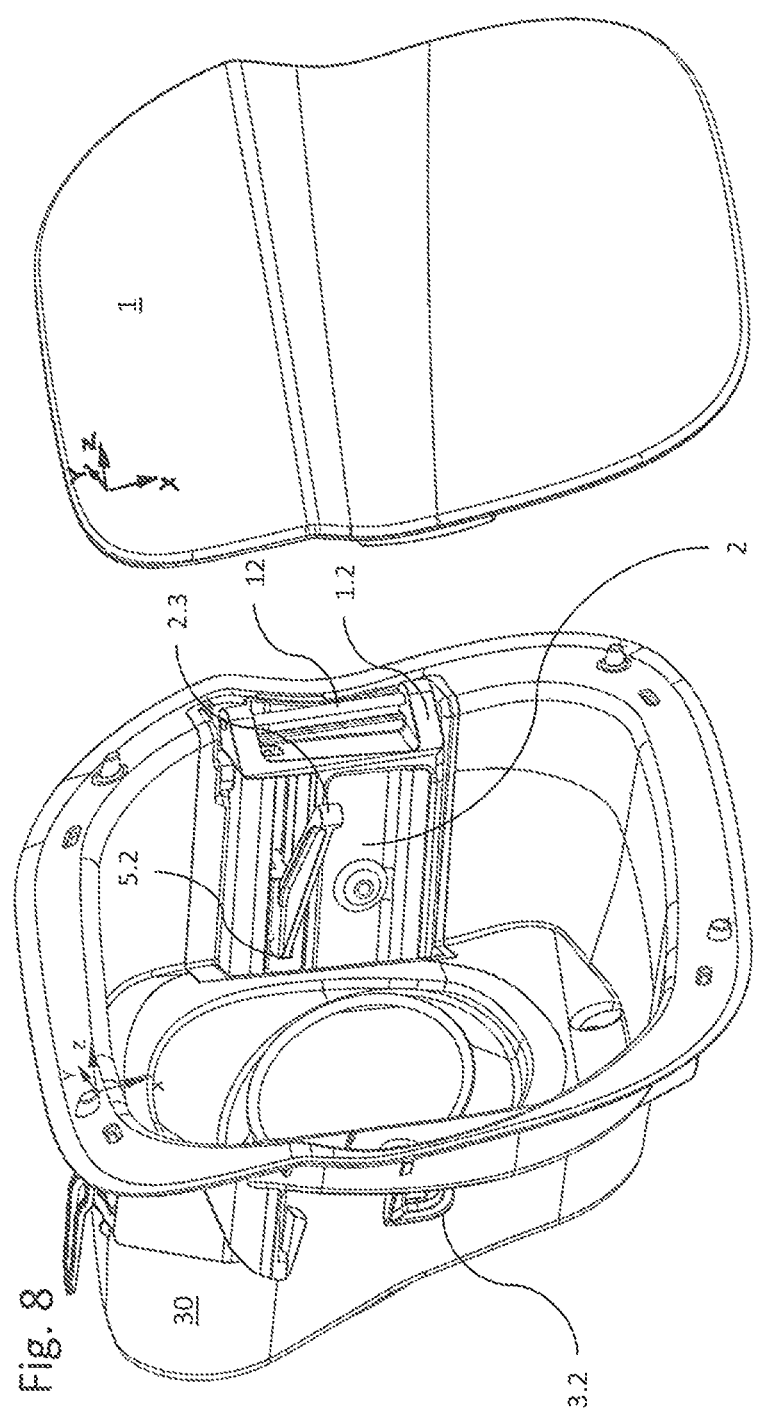
FIG. 8 shows the flap arrangement of FIG. 6 with a tank flap in a closing position that is partly lifted off in the manner of an exploded representation.

FIG. 6 shows the flap arrangement with a tank flap 1 in an open position and a plunger 2 in a pivot end position, FIG. 7 the flap arrangement in the same position, wherein the plunger 2 and the tank flap 1 which is rotatably mounted thereon via a hinge shaft 12 (see FIG. 9) are pulled out in the manner of an exploded representation for illustrating a transmission.

The plunger 2 is moveably mounted on a tank trough 30 (see FIG. 7) in projection direction A.

The flap arrangement comprises a push-push kinematic for the locking and unlocking of the tank flap 1 through consecutive engaging of the plunger 2 against the projection direction A, of which in FIG. 6-9 a base-fixed link member 3.2 is noticeable, in which a flap-fixed engagement member (not shown) can engage.

Figure 9:
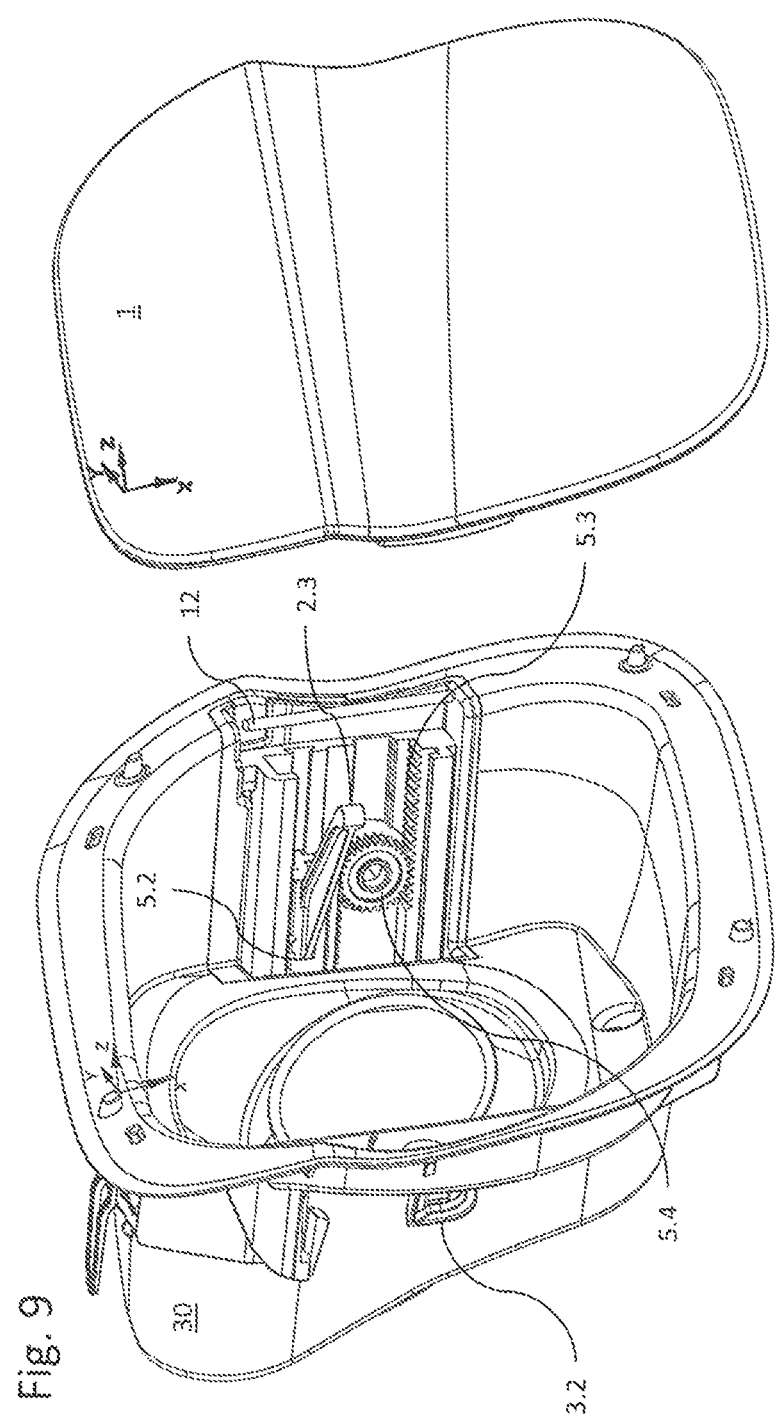
FIG. 9 shows the flap arrangement of FIG. 8 with removed plunger.

The flap arrangement of FIG. 6-9 comprises a gear transmission for the pivoting-out of the tank flap 1 as a consequence of a movement of the plunger 2 in the projection direction A, which in contrast with the embodiment of FIG. 1-5 does not have any dead travel for moving the plunger 2 in the projection direction A in a disengaged position without pivoting out the tank flap 1 and is evident in particular in FIG. 7, 9, in which the plunger 2 is pulled out in the manner of an exploded representation (FIG. 7) or removed or not shown (FIG. 9). In FIG. 9, the tank flap 1 is additionally pulled out in the manner of an exploded representation, in FIG. 8 a bearing part 1.2 of the tank flap 1 which in this regard is only partially pulled out in the manner of an exploded representation is shown on the hinge shaft 12 for illustration.

The transmission comprises a rack 5.2 that is moveably mounted in projection direction A with a stop 2.3 for limiting pivoting-in of the tank flap 1, which projects or overhangs obliquely to a toothing of the rack 5.2. The transmission furthermore comprises a base-fixed toothing 5.3 and a gear 5.4 which (as indicated in FIG. 7 in dash-dotted line) is rotatably mounted on the plunger 2 and meshes with the toothing 5.3 and the rack 5.2. As becomes evident from viewing FIGS. 7 and 9 together, the gear 5.4 which is rotatably mounted on the plunger 2 rolls on the base-fixed toothing 5.3, with which it meshes, when the plunger 2 is moved in the projection direction A. The gear 5.4 meshes with the rack 5.2 and thus moves the same in the projection direction A so that the rack 5.2 pivots out the tank flap 1 via the stop 2.3.

The flap arrangement comprises a mechanical preload means in the form of a tension spring for preloading the plunger 2 in the projection direction A. The same is tensioned between a rack-fixed articulation point 6.1 and a plunger-fixed articulation point 6.2, but is itself not visible in the figures. It is thus arranged on the transmission for pivoting out the tank flap 1, in particular between the rack 5.2 of the transmission and the plunger 2.

Because of the transmission function, which converts a movement of the plunger 2 in projection direction A into a pivoting-out of the tank flap 1, this tension spring is conversely preloaded by a retraction of the plunger 2 against the projection direction A and accordingly seeks to drive the plunger 2 out in projection direction.

Although in the preceding description exemplary embodiments were explained it is pointed out that a large number of modifications is possible. It is additionally pointed out that the exemplary embodiments are merely examples which are not intended to restrict the scope of protection, the applications and the construction in any way. The preceding description rather provides the person skilled in the art with a guideline for implementing at least one exemplary embodiment, wherein various changes, in particular with respect to the function and arrangement of the described components can be made without leaving the scope of protection as obtained from the claims and feature combinations equivalent to these.

What is claimed is:

1. A flap arrangement for a motor vehicle comprising:
   a base having a flap border defining an opening formed in the base;
   a plunger operably coupled to the base and slidably positionable between a retracted position and an extended position; and
   a flap rotatably supported on the plunger such that the flap translates from a closed position away from the flap border to a pivot start position as the plunger moves from the retracted position to the extended position, and rotates from the pivot start position to an open position;
   wherein the flap is flush with the flap border to conceal the opening when in the closed position and projects away from the flap border to reveal the opening when in the open position.

2. The flap arrangement according to claim 1 wherein the flap is a fuel filler flap and the flap arrangement further comprises a filler neck disposed within the opening.

3. The flap assembly according to claim 1 wherein the plunder comprises a link member operably coupled to the flap in an articulated manner and coupled to the plunger is guided in a form-fitting manner.

4. The flap arrangement according to claim 1 wherein the plunger comprises a gear for pivoting the flap due to a displacement of the plunger toward the extended position.

5. The flap arrangement according to claim 1, further comprising a transmission coupling the plunger and the flap such that there is no idle travel for displacing the plunger in a disengaged position toward the extended position without pivoting of the flap.

6. The flap arrangement according to 5, wherein the transmission comprises a link guide and/or at least one gear wheel.

7. The flap assembly according to claim 6, wherein the transmission comprises a rack having a toothing and at least one rotatably mounted gear wheel meshing with the rack.

8. The flap assembly according to claim 7, wherein the gear wheel is rotatably mounted to the base and the rack is fixed to the plunger.

9. The flap assembly according to claim 5, further comprising a spring mechanism for biasing the plunger in the extended position, the spring mechanism coupled to the transmission for pivoting the flap.

10. The flap arrangement according to claim 1 further comprising a stop for limiting at least one of an input, pivoting out of the flap, and a displacement of the plunger in the extended position.

11. The flap arrangement according to claim 1, further comprising a spring mechanism for biasing the plunger in the extended position.

12. The flap assembly according to claim 10, wherein the spring mechanism is arranged in a guide of the plunger to the base.

13. The flap arrangement according to claim 1, wherein the open position is at least substantially perpendicular to an axis of rotation about which the flap is mounted rotatably on the ram.

14. A flap arrangement for a motor vehicle comprising:
    a base having a flap border defining an opening formed in the base;

a plunger operably coupled to the base and slidably positionable between a retracted position and an extended position;

a push-push kinematic mechanism for locking and unlocking the plunger by successively engaging the push-pull mechanism in the retracted position; and a flap rotatably supported on the plunger such that the flap translates from a closed position away from the flap border to a pivot start position as the plunger moves from the retracted position to the extended position, and rotates from the pivot start position to an open position;

wherein the flap is flush with the flap border to conceal the opening when in the closed position and projects away from the flap border to reveal the opening when in the open position.

15. The flap assembly according to claim 14, wherein the push-push kinematic mechanism comprises a sliding member and an engaging member.

* * * * *